United States Patent Office 3,182,028
Patented May 4, 1965

---

3,182,028
PREPARATION OF POLYMERIC MATERIALS BY THE REACTION OF ARYLDIPHOSPHINES WITH ARYL DIAZIDES
David L. Herring, Riverside, Calif., assignor to the United States of America as represented by the Secretary of the Navy
No Drawing. Filed Apr. 19, 1962, Ser. No. 188,907
2 Claims. (Cl. 260—2)
(Granted under Title 35, U.S. Code (1952), sec. 266)

The invention herein described may be manufactured and used by or for the Government of the United States of America for governmental purposes without the payment of any royalties thereon or therefor.

The present invention relates to aryldiphosphines and more particularly to the preparation of polymeric materials from the reaction of 1,4-bis(diphenylphosphino)benzene with 1,4-diazidobenzene.

The present invention has produced new and useful dielectric materials; these materials may also be useful semi-conductor materials.

This invention is related to copending application Serial No. 188,906, filed April 19, 1962, now U.S. Patent No. 3,064,055, for Preparation of 1,4-bis(diphenylphosphino)benzene, and copending application Seral No. 188,905, filed April 19, 1962, now U.S. Patent No. 3,123,621, for the Preparation of Aryl Azides and Aryl Diazides by the Reaction of the Diazoniumtetrafluoroborate Salt with Alkali Azides.

It is an object of the invention therefore to provide new compounds useful as dielectric materials.

It is another object of the invention to provide a new method for synthesizing particular polymeric materials.

Other objects and many of the attendant advantages of this invention will become readily appreciated as the same becomes better understood by reference to the following detailed description.

The new method for synthesizing polymeric materials and new materials resulting from the application of the new method disclosed in this invention is described in the following procedure:

To 1.5 g. of 1,4-bis(diphenylphosphino)benzene dissolved in 75 ml. of benzene a solution containing 0.5 g. of 1,4-diazidobenzene dissolved in 25 ml. of benzene was added at 25° C. Nitrogen was slowly evolved and the solution gradually turned pink in color during the 4-hour course of the reaction. A reddish-orange precipitate which formed was collected and extracted with 100 ml. of boiling benzene to remove any unreacted starting material. The benzene insoluble polymeric mixture was removed by filtration and, after drying in vacuum, weighed 1.3 g. (70%). The product softened over the range 150–200° C. and yielded on cooling, a hard amber colored glassy material.

*Analysis.*—Calcd. for $(C_{36}H_{28}P_2N_2)_x$: C, 78.6; H, 5.1; P, 11.2; N, 5.1. Found: C, 78.7; H, 5.1; P, 11.2; N, 4.8.

In addition to benzene other non-polar solvents may be used.

In a second series of experiments where the ratio of 1,4-diazidobenzene to 1,4-bis(diphenylphosphino)benzene was varied from 1:1 to 2:1 materials different from those described above resulted. In a typical experiment, 1.5 g. of 1,4-bis(diphenylphosphino)benzene reacted with 1.0 g. of 1,4-diazidobenzene and yielded a polymeric mixture which melted at 120–140° C., lost $N_2$ during the melting process, finally resolidified and yielded a material which did not melt at 300° C.

The loss of $N_2$ during the process of melting the polymeric material at 120–140° C. described above, appears to parallel in part the reaction in which phenylazide upon being heated loses $N_2$ and forms azobenzene. Thus, the polymeric materials described above are expected to contain azolinks in the polymeric chains.

The invention disclosed herein is described by the equations:

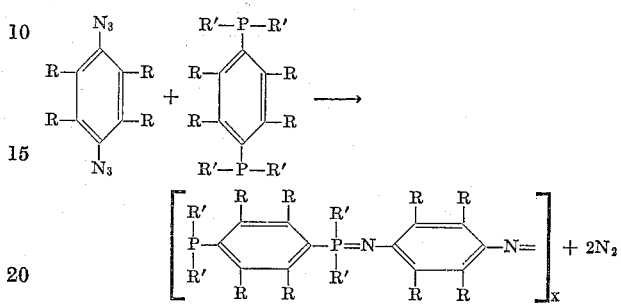

where R=H, halogen, alkyl or aryl and R'=alkyl, alkoxy, aryl and aryloxy.

Similar polymers can possibly be made by the following more tedious reactions.

(a) $R_2PC_6H_4PR_2 \xrightarrow{Cl_2} R_2P(Cl)_2C_6H_4P(Cl)_2R_2$ (b) $R_2P(Cl)_2C_6H_4P(Cl)_2R_2 + H_2NC_6H_4NH_2 \rightarrow$
$[R_2PC_6H_4P(R_2)NC_6H_4N=]_x$ This above reaction would be expected to yield undesirable side reactions and the isolation of pure materials would be difficult.

Obviously many modifications and variations of the present invention are possible in the light of the above teachings. It is therefore to be understood that within the scope of the appended claims the invention may be practiced otherwise than as specifically described.

What is claimed is:

1. A benzene-insoluble polymer consisting of recurring units of the formula

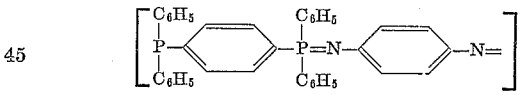

2. The method for synthesizing a benzene-insoluble polymer consisting of the recurring units of the formula

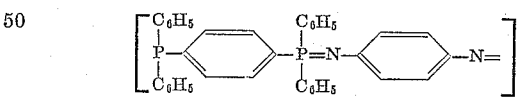

which comprises reacting 1 mole of 1,4-bis(diphenylphosphino)benzene dissolved in benzene with 1 mole of 1,4-diazidobenzene dissolved in benzene in the temperature range from 25° C. to 80° C. while permitting nitrogen to slowly evolve during the course of the reaction, and removing the polymeric product formed from solution.

References Cited by the Examiner

FOREIGN PATENTS 1,243,608   9/60   France.

MURRAY TILLMAN, *Primary Examiner.*

J. R. LIBERMAN, *Examiner.*